United States Patent [19]
Beakes et al.

[11] Patent Number: 5,765,274
[45] Date of Patent: Jun. 16, 1998

[54] STATOR MANUFACTURING METHOD

[75] Inventors: John M. Beakes, Fairborn; Nathan A. Buckner, Huber Heights; Gary E. Clemenz, Bellbrook; Patrick A. Dolgas, Milford, all of Ohio

[73] Assignee: Globe Products Inc., Huber Heights, Ohio

[21] Appl. No.: 762,577

[22] Filed: Dec. 9, 1996

Related U.S. Application Data

[60] Provisional application Nos. 60/022/548 Jun. 20, 1996 and 06/017,683 May 21, 1996.

[51] Int. Cl.$^6$ ............................................. H02K 15/095
[52] U.S. Cl. .............................. 29/596; 29/732; 29/736; 242/432
[58] Field of Search ........................... 29/596, 597, 598, 29/732, 736, 564.1, 564.6, 564.8; 140/92.1, 92.2; 242/432, 432.1–432.6

[56] References Cited

U.S. PATENT DOCUMENTS

| | | |
|---|---|---|
| 3,879,981 | 4/1975 | Richards . |
| 4,000,764 | 1/1977 | Reiger, Jr. . |
| 4,074,418 | 2/1978 | Pearsall . |
| 4,351,109 | 9/1982 | Kelly et al. . |
| 4,612,702 | 9/1986 | Wheeler . |
| 4,713,883 | 12/1987 | Santandrea et al. . |
| 4,723,354 | 2/1988 | Moser . |
| 4,762,283 | 8/1988 | Sabatino . |
| 4,858,835 | 8/1989 | Luciani et al. . |
| 4,946,111 | 8/1990 | Luciani et al. . |
| 4,991,782 | 2/1991 | Luciani . |
| 4,994,697 | 2/1991 | Santandrea . |
| 4,997,138 | 3/1991 | Luciani et al. . |
| 5,065,503 | 11/1991 | Luciani et al. . |
| 5,090,108 | 2/1992 | Banner et al. . |
| 5,099,568 | 3/1992 | Santandrea . |
| 5,137,221 | 8/1992 | Santandrea et al. . |
| 5,186,405 | 2/1993 | Beakes et al. . |
| 5,193,755 | 3/1993 | Luciani . |
| 5,214,838 | 6/1993 | Beakes et al. . |
| 5,233,751 | 8/1993 | Luciani et al. . |
| 5,239,743 | 8/1993 | Santandrea . |
| 5,245,748 | 9/1993 | Luciani et al. . |
| 5,257,745 | 11/1993 | Lombardi et al. . |
| 5,288,088 | 2/1994 | Santandrea et al. . |
| 5,291,649 | 3/1994 | Lombardi et al. . |
| 5,341,997 | 8/1994 | Luciani . |
| 5,361,487 | 11/1994 | Luciani et al. . |
| 5,370,324 | 12/1994 | Beakes et al. . |
| 5,383,620 | 1/1995 | Lombardi et al. . |
| 5,392,506 | 2/1995 | Luciani et al. . |
| 5,413,289 | 5/1995 | Santandrea et al. . |
| 5,413,403 | 5/1995 | Beakes et al. . |
| 5,484,114 | 1/1996 | Santandrea et al. . |
| 5,495,659 | 3/1996 | Beakes et al. . |
| 5,531,141 | 7/1996 | Gilbert, Jr. . |
| 5,535,503 | 7/1996 | Newman . |
| 5,549,253 | 8/1996 | Beakes et al. . |
| 5,618,007 | 4/1997 | Beakes et al. . |
| 5,685,061 | 11/1997 | Beakes . |

OTHER PUBLICATIONS

Co–pending application of John M. Beakes, serial No. 08/425,866, filed Apr. 20, 1995 Titled "Stator Manufacturing Method and Apparatus".

WO 96/34446, serial No. PCT/US96/015184, John M. Beakes, filed 15 Apr. 1996 Titled Stator Manufacturing Method and Apparatus, PCT Application; A2 publication.

*Primary Examiner*—Carl E. Hall
*Attorney, Agent, or Firm*—Roger S. Dybvig

[57] ABSTRACT

Stator coil lead wires are coursed along complex, circuitous paths on the end of a stator core and trimmed at a precise predetermined distance from the stator core. Improved end effector wire-guiding tooling member are provided in place of conventional gripper jaws to permit the lead wires to be coursed along complex, circuitous paths. In addition, an improved lead pull assembly, improved temporary wire clamps, and a wire former assembly are provided.

7 Claims, 14 Drawing Sheets

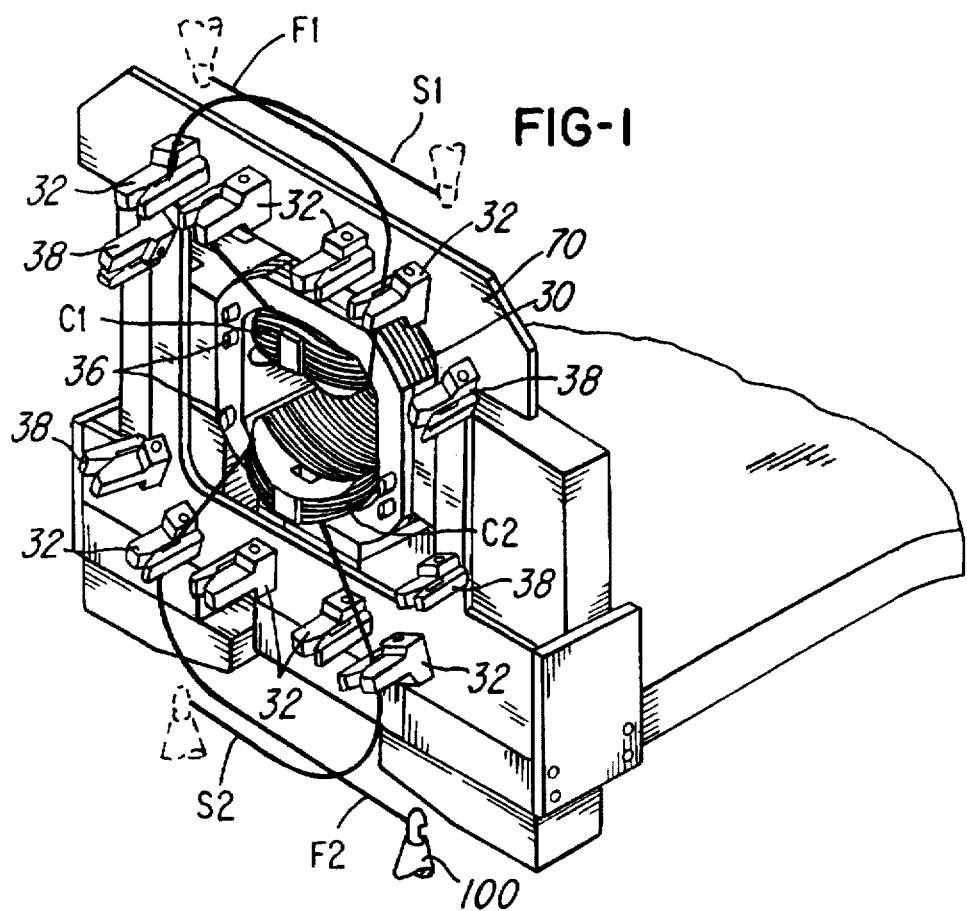
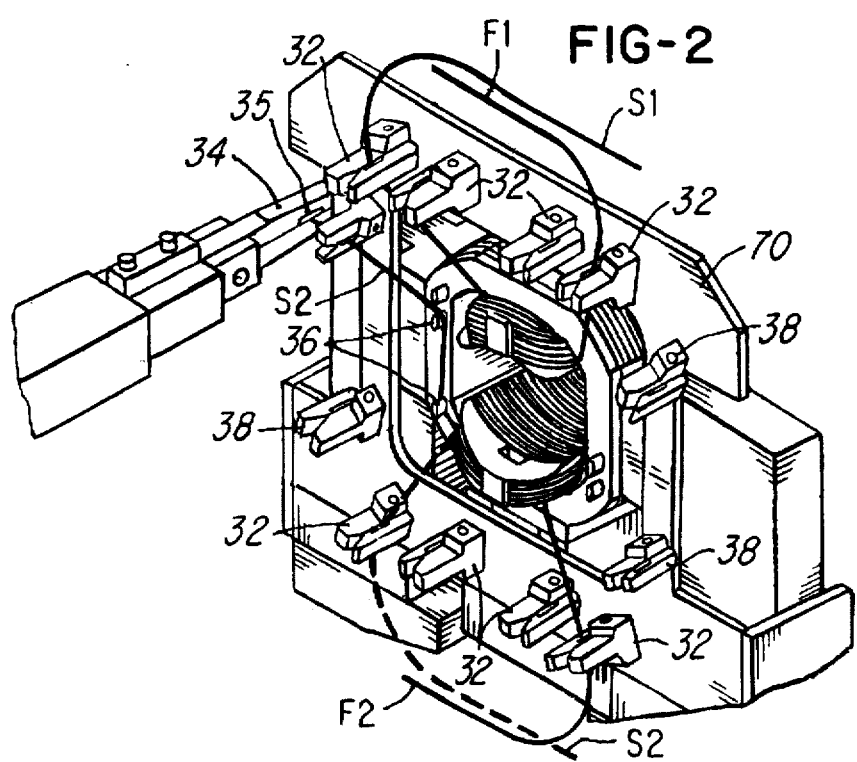

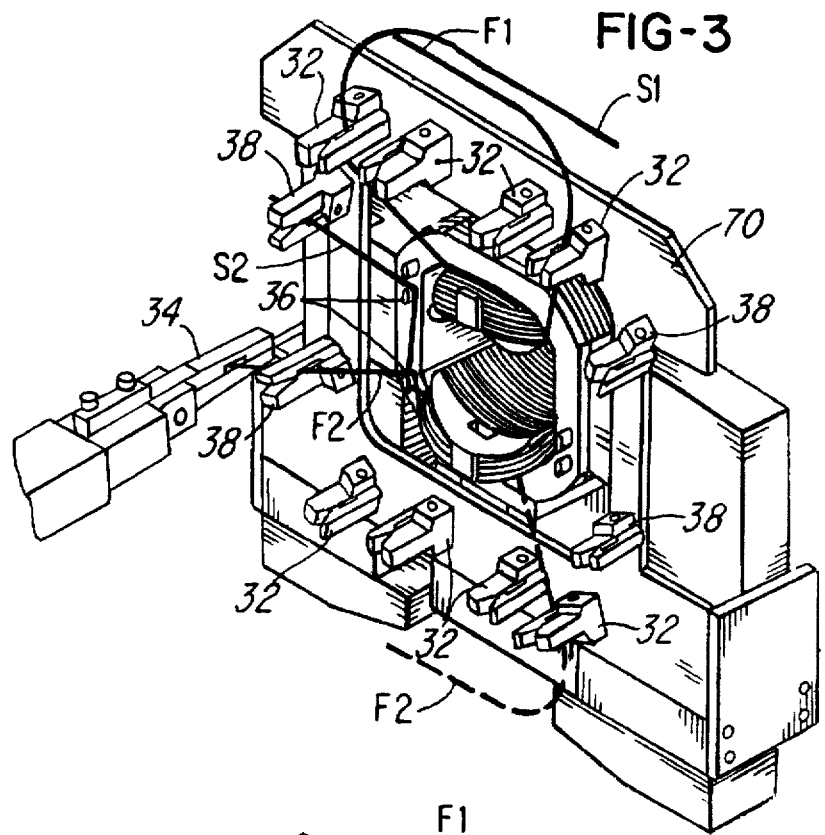
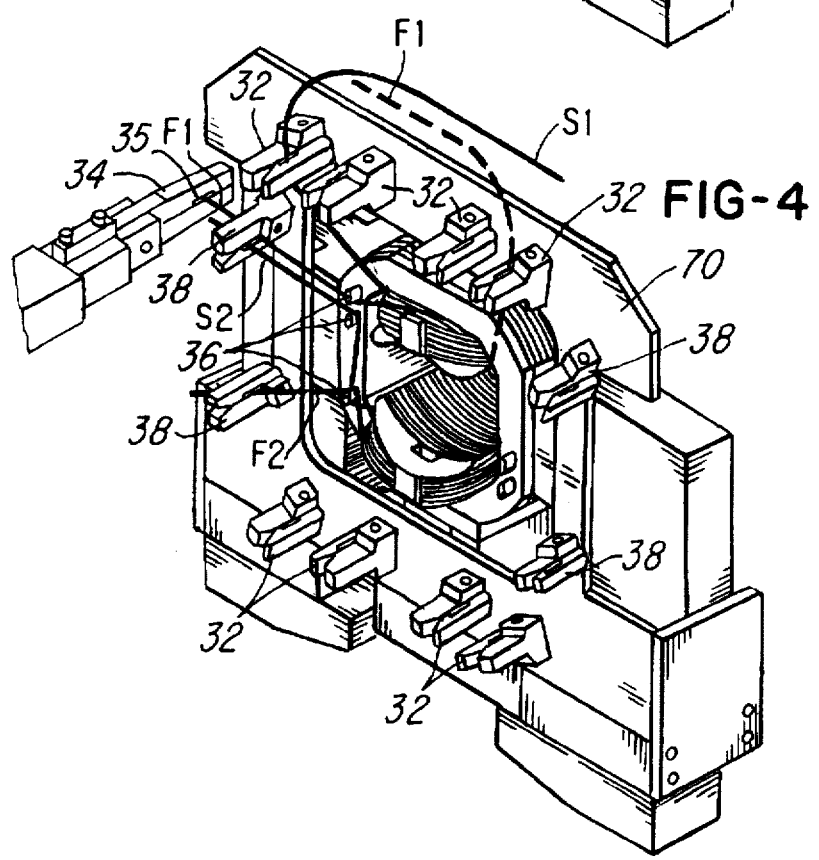

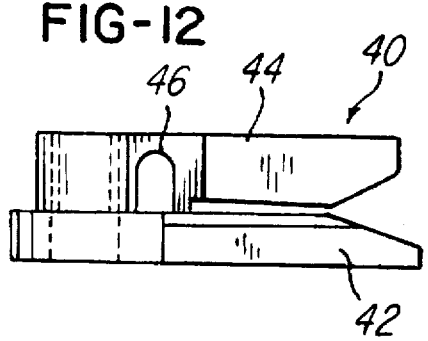
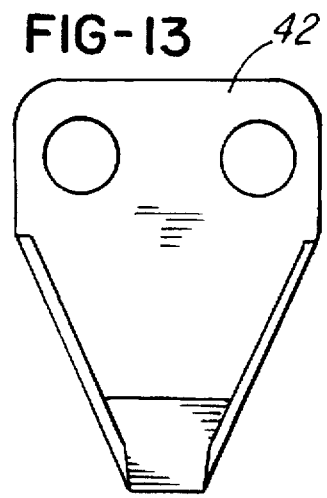
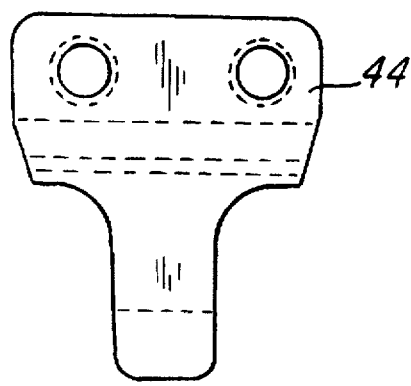
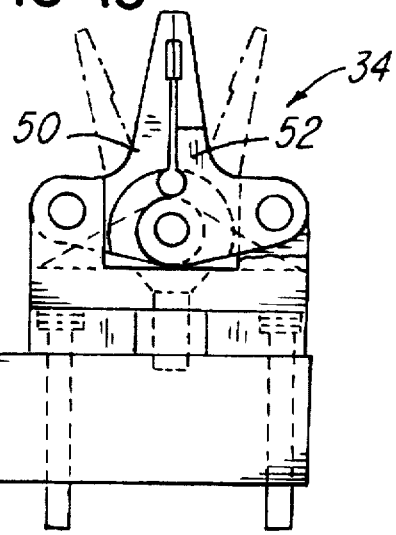
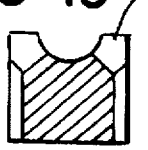
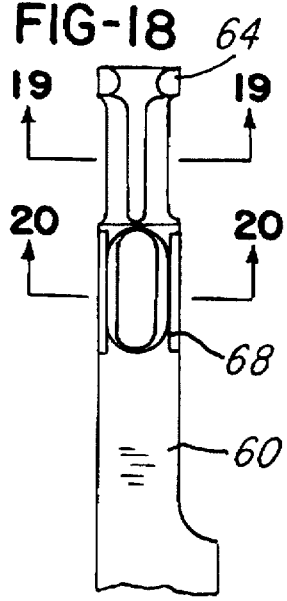
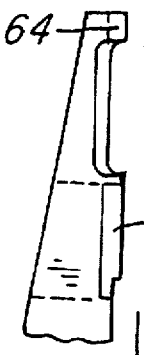
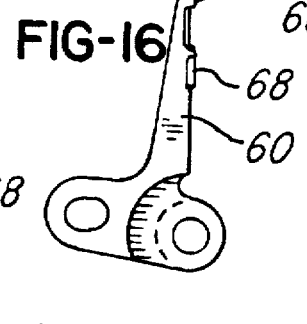
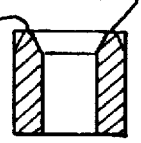

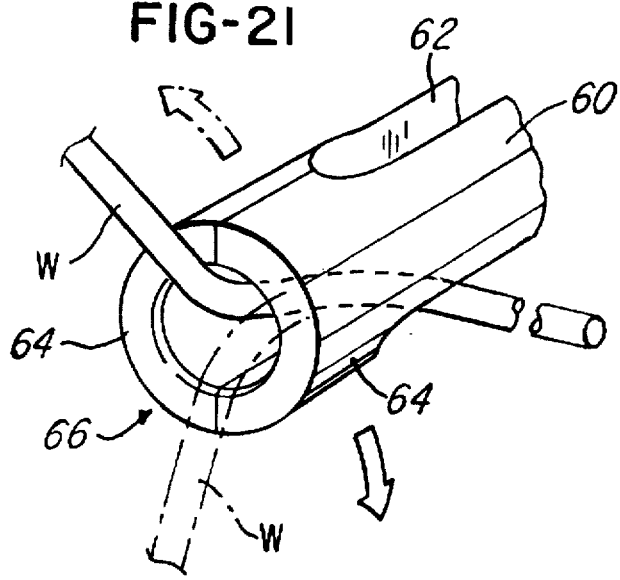
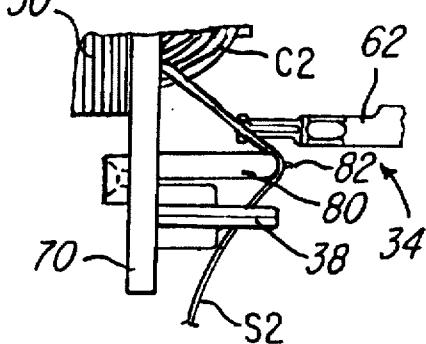
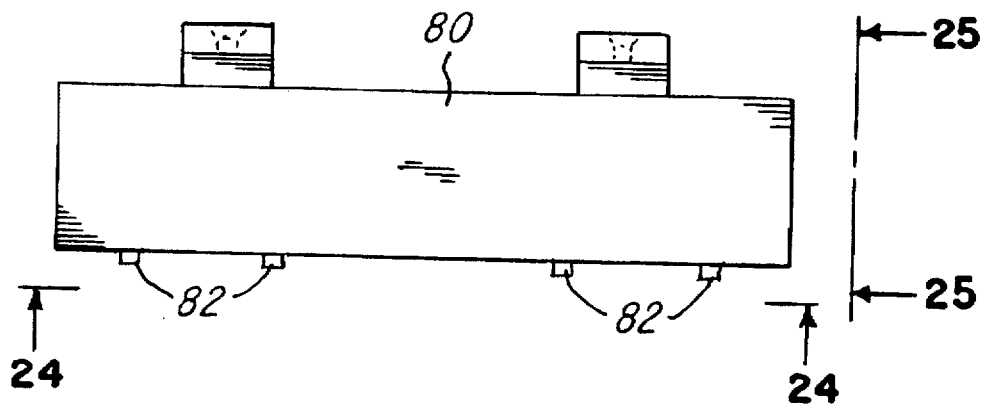
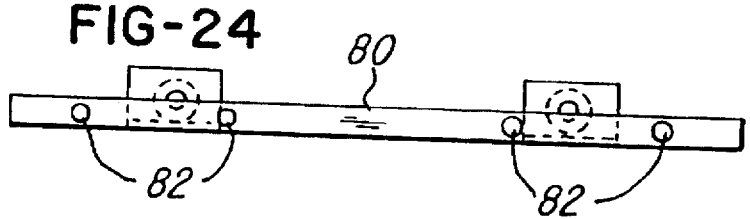
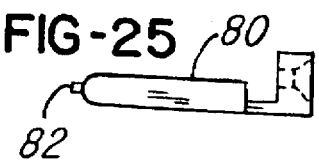

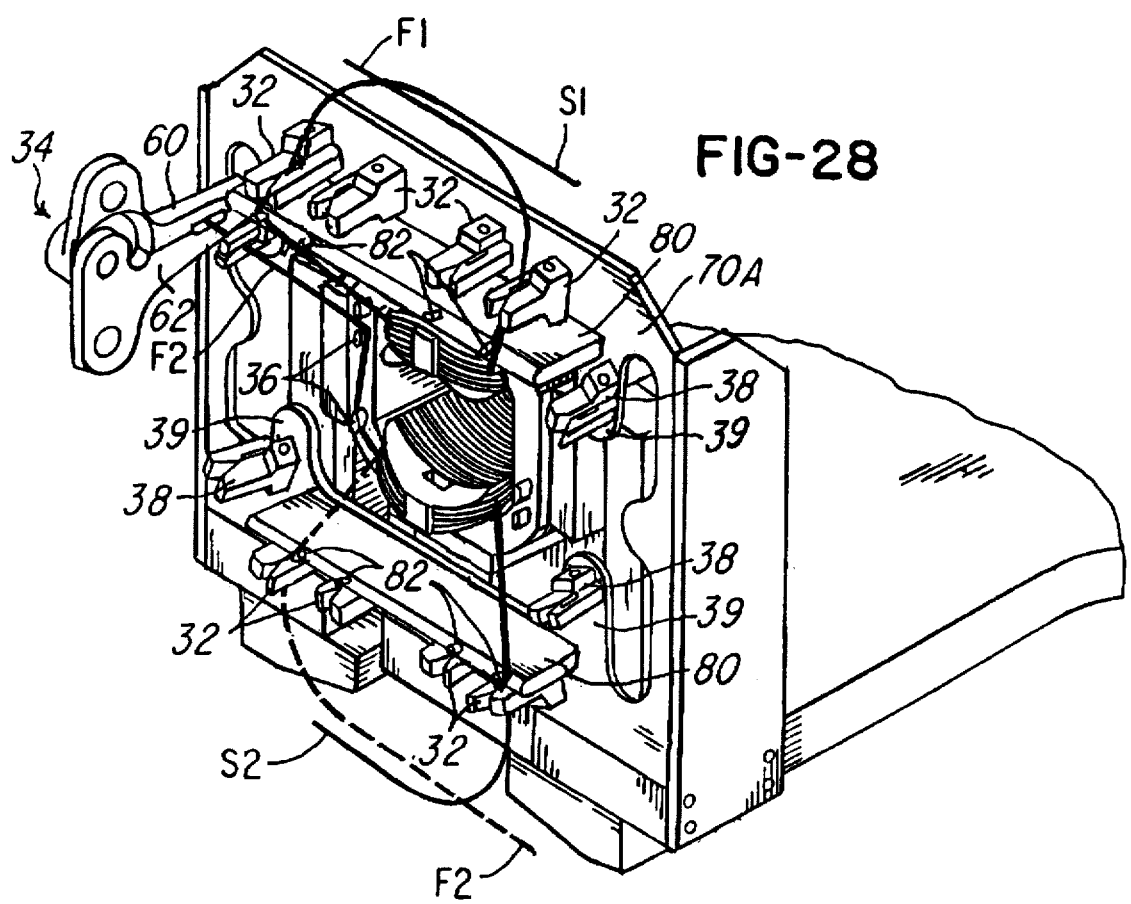

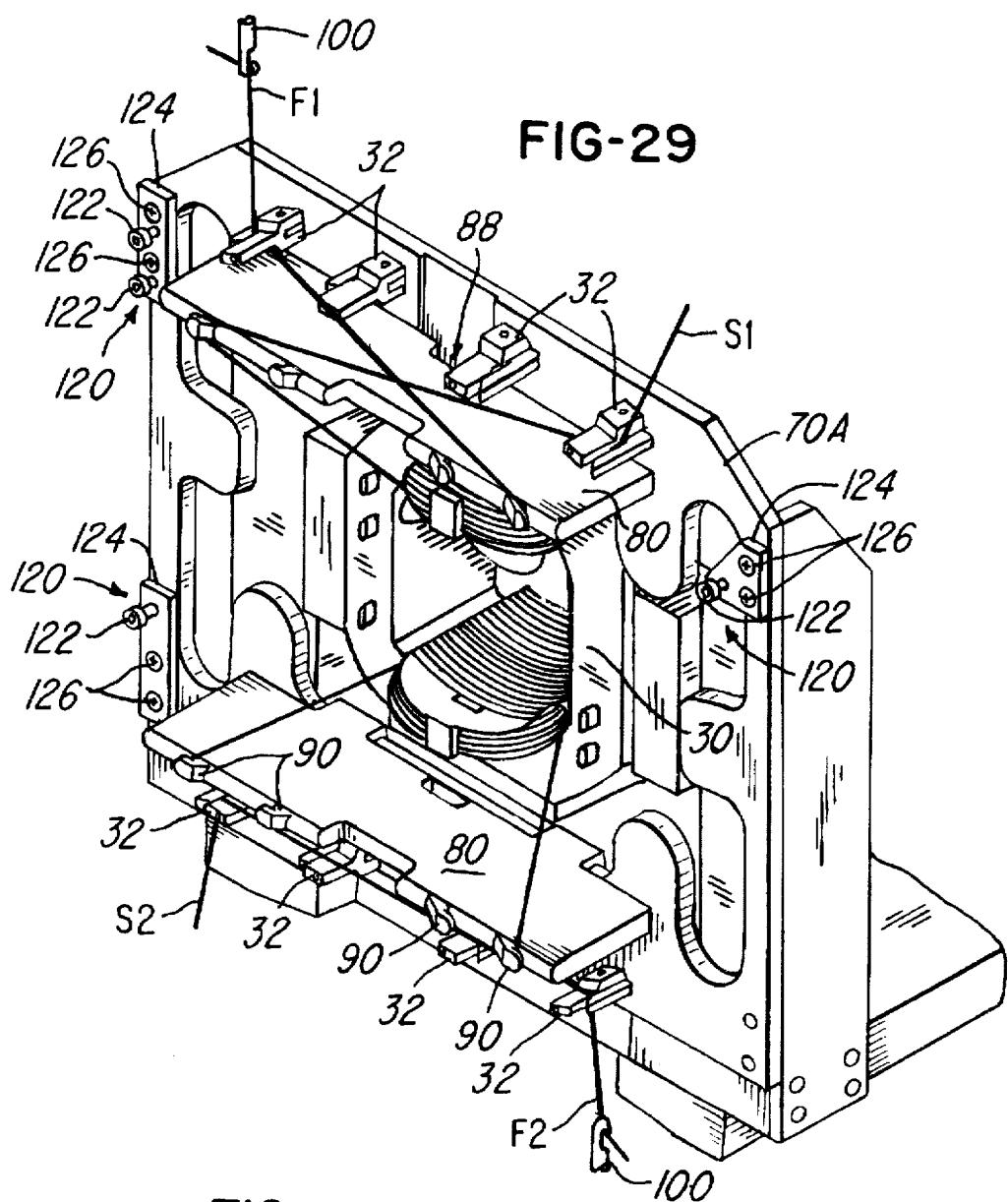
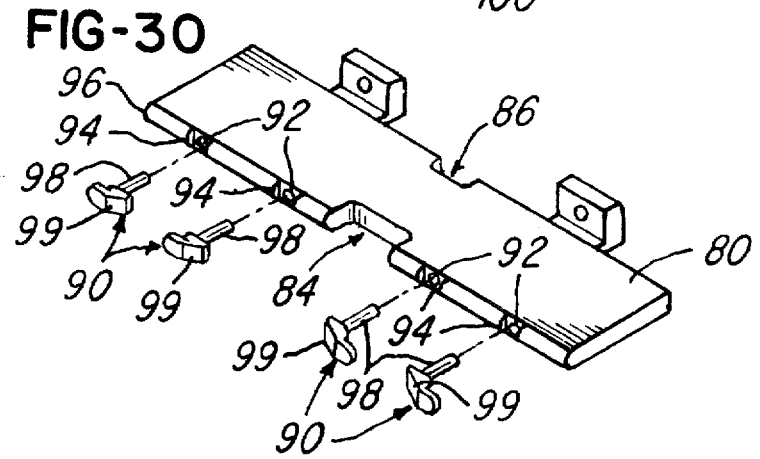

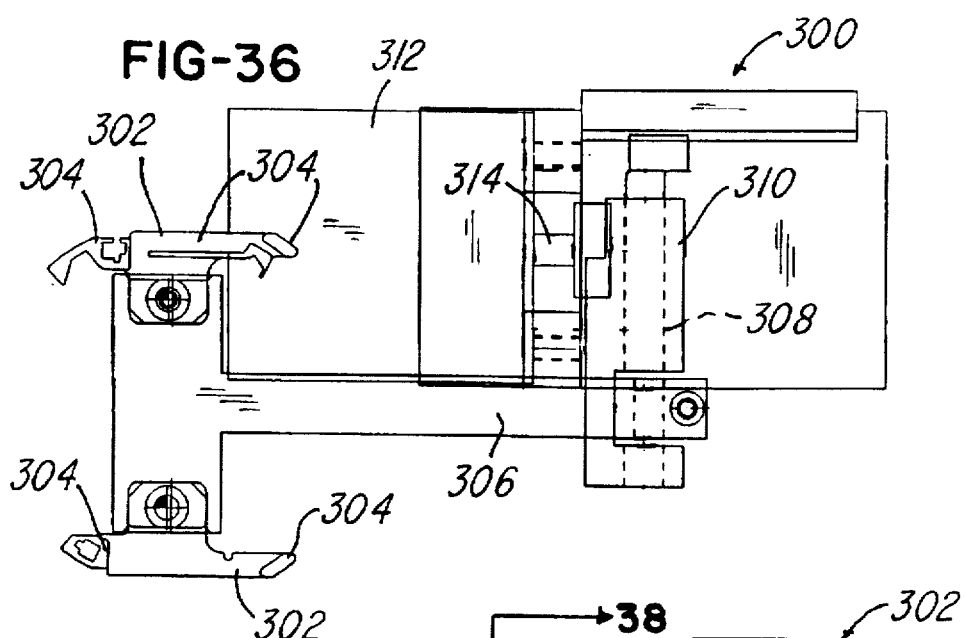
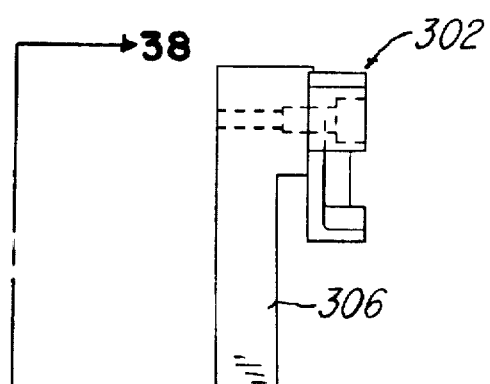
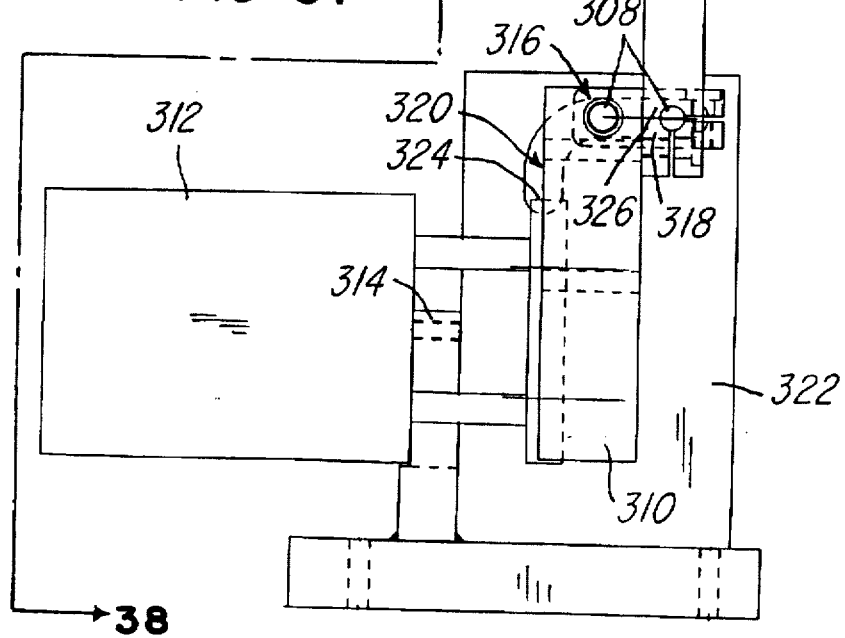

STATOR MANUFACTURING METHOD

CROSS-REFERENCE TO RELATED APPLICATIONS

This is a continuation-in-part of copending provisional application Ser. Nos. 60/022,548, filed Jun. 20, 1996, and 60/017,683, filed May 21, 1996.

FIELD OF THE INVENTION

This invention relates to methods and apparatus for manufacturing electric motor stators and, although not so limited, particularly for manufacturing two-pole stators.

INCORPORATION BY REFERENCE

The following patents and other published documents are hereby incorporated herein by reference:

U.S. Pat. No. 5,495,659
U.S. Pat. No. 5,413,403
U.S. Pat. No. 5,370,324
U.S. Pat. No. 5,186,405
U.S. Pat. No. 5,090,108
U.S. Pat. No. 4,074,418
PCT publication WO 96/34446.

BACKGROUND OF THE INVENTION

The need arises for stator coil lead wires to be anchored to a stator and cut automatically to close tolerances with regard to length, for example, within 1 mm from a fixed reference point on the stator core. Three axis industrial robots are now commonly used to anchor or connect stator coil leads to stators, partly because of the ability to change over robots to handle various different anchoring and cutting tasks in minimal time. Prior art lead wire trimming methods using robots to sever stator coil lead wires are not generally capable of cutting leads to close tolerances. Also, the wires used to form stator coils may exhibit different degrees of stretching, which can have an effect on the length of the cut coil lead using typical robot lead wire connecting and cutting techniques. Therefore, there exists a need for an improved method and apparatus using an industrial robot for performing such trimming operations within close tolerances.

There are also occasions in which the stator coil leads must be coursed through a complex, circuitous path along the end face of the stator core, and the need exist for an improved method and apparatus for coursing the stator coil leads across the face of a stator core.

SUMMARY OF THE INVENTION

An object of this invention is to provide a method and an apparatus for trimming stator coil lead wires within close tolerances so that the coil lead wires meet exacting requirements of motor manufacturers.

In another aspect of this invention, an object is to provide an improved method and apparatus for coursing stator coil lead wires across and adjacent the end face of a stator core.

In yet another aspect of this invention, an object is to provide improved wire handling structures for use in achieving the foregoing objects.

In accordance with this invention, a stator coil lead wire is coursed by a robot end effector across the end face of the stator core, across a margin of the stator core, and then secured to an anchor radially spaced from the stator-core. While the lead wire is secured to the anchor, the lead wire is cut, preferably by operation of the end effector, at a predetermined distance from the stator core. The anchor may be a clamp or clip having opposed jaws which grip the lead wire or it may be a post around which the lead wire is at least partially looped.

In order to better course the lead wires along a complex, circuitous path on the stator end face, a conventional robot end effector is modified in accordance with this invention to include opposed wire-guiding tooling members in place of the gripper jaws, thereby permitting precision control of the lead wires. In accordance with this invention, each opposed wire-guiding tooling member of the robot end effector is provided with a concavely arcuate, generally C-shaped portion at its free end facing the opposite wire-guiding tooling member. When the end effector wire-guiding tooling members are closed, the confronting C-shaped portions form a ring or eyelet that encloses a lead wire.

To better permit the improved end effector wire-guiding tooling members to capture a coil lead to be manipulated, a ledge-like structure is provided in the path of the coil leads inserted into temporary wire clamps at the winding station. Such ledge cause the lead wires to extend to the clamps at an artificially steep angle relative to vertical, which more readily permits the leads to be enclosed within the end effector eyelet at a robot wire handling station. In addition, the coil leads extending to the temporary wire clamps are also coursed around projections, such as dowel pins or hooks, extending from the front, wire-engaging surface of the ledge to ensure that the location of each lead wire is established with precision.

Further in accordance with this invention, various wire handling structures known in the art are improved to provide the desired wire handling characteristics. An improved lead pull assembly is provided which permits the lead pull assembly to retain control over a lead wire even if a slack wire condition occurs in the wire. An improved temporary wire clamp is also provided which ensures that lead wires inserted or "stuffed" therein using a tamp blade remain in the wire clamp as the tamp blade is withdrawn. Also, since the lead wires are coursed along a path on the stator core end face, wire forming tooling is provided having a wire former with surfaces contoured to conform substantially to the path of the lead wires along the stator core end face. The wire former presses against the lead wires to force the lead wires to a position closer to the stator core end face.

The foregoing and other objects and advantages of this invention will become apparent from the following description and the accompanying drawings.

BRIEF DESCRIPTION OF THE DRAWINGS

FIG. 1 is a fragmentary perspective view of parts of a stator winding machine in accordance with this invention and illustrates diagrammatically the manner in which the coil leads extending from the coils of a freshly wound stator may be handled at a stator coil winding station.

FIGS. 2 through 5 are each fragmentary perspective views of parts of the stator winding machine of FIG. 1 with the freshly wound stator core located at a stator coil lead anchoring and cutting station and show, in sequence, different stages in the anchoring of stator coil lead wires temporary wire clips by means of a robot partly illustrated therein.

3

Figure 7:
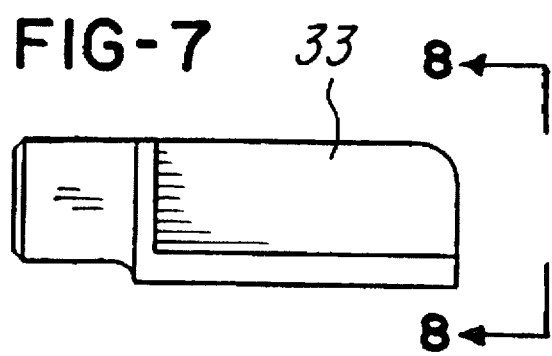
FIG. 7 is a side elevational view of the improved lead wire tamping blade of FIG. 6 taken along line 7—7 thereof.
Figure 8:
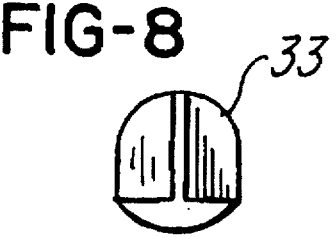

FIG. 8 is a end elevational view of the improved lead wire tamping blade of FIG. 7 taken along line 8—8 thereof.

Figure 9:
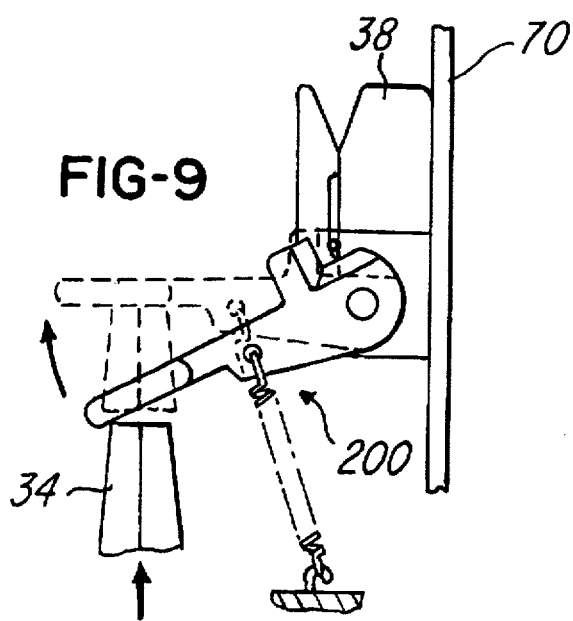

FIG. 9 is an elevational view of a lead wire cutting mechanism that may be used for cutting the stator coil leads at the stator coil lead anchoring and cutting station. FIG. 9 also shows part of a robot used to operate the cutting mechanism.

Figure 10:
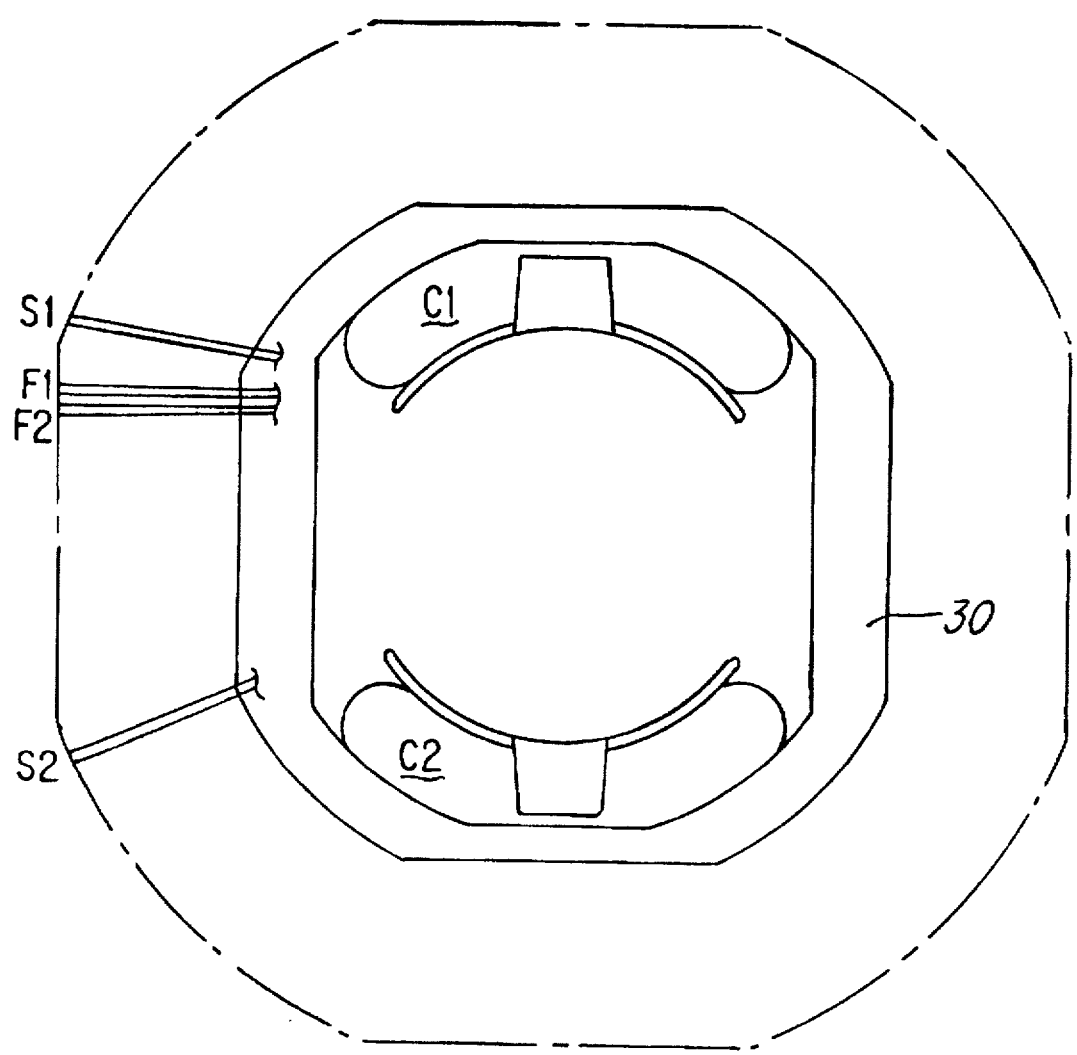
Figure 11:
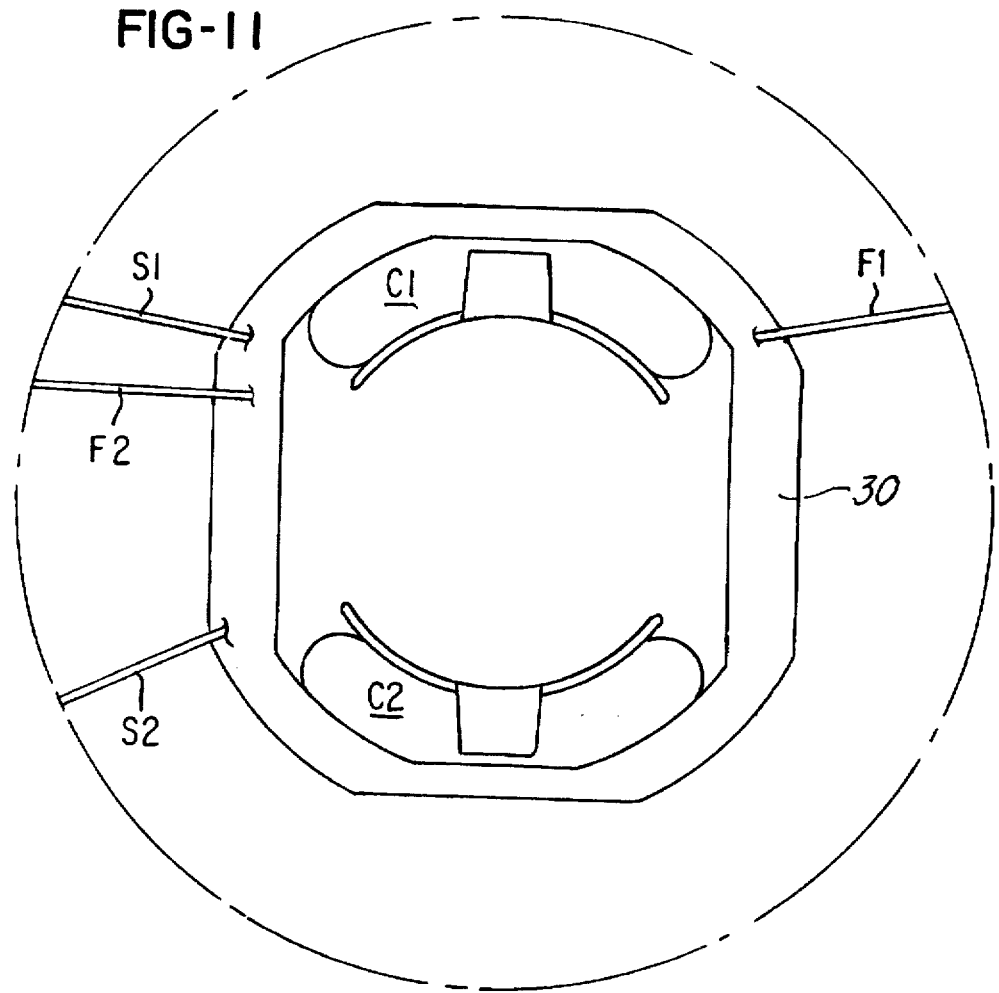

FIGS. 10 and 11 are diagrammatic views of a stator having stator coil lead wires accurately trimmed in accordance with this invention.

FIG. 12 is a side elevational view of an alternate temporary wire clip that may be used in place of the temporary wire clip shown in FIGS. 2 through 5.

FIG. 13 is a top plan view of a lower base portion forming part the alternate temporary wire clip shown in FIG. 12.

FIG. 14 is a top plan view of an upper jaw forming part of the alternate temporary wire clip shown in FIG. 12.

FIG. 15 illustrates a prior art robot end effector having opposed gripping jaws.

FIG. 16 is a top plan view of an improved wire-guiding tooling member in accordance with this invention that may be used in place of the opposed gripping jaws shown in FIG. 15.

FIG. 17 is an enlarged, fragmentary plan view of a portion of the wire-guiding tooling member shown in FIG. 16.

FIG. 18 is a fragmentary side elevational view of the portion of the wire-guide tooling member shown in FIG. 17 taken along line 18—18 thereof.

FIG. 19 is cross-sectional view of the wire-guide tooling member of FIG. 18 taken along line 19—19 thereof.

FIG. 20 is cross-sectional view of the wire-guide tooling member of FIG. 18 taken along line 20—20 thereof.

FIG. 21 is fragmentary perspective view of a portion of a robot end effector, as shown in FIG. 15, modified to include a pair of opposed wire-guiding tooling members, as shown in FIGS. 16 through 20, operatively-engaged with a lead wire.

FIG. 22 is a side elevational view showing a coil lead wire in the process of being operatively engaged or "hooked" by an end effector using the end effector tooling shown in FIGS. 16 through 21. FIG. 22 also shows a wire-guiding ledge in accordance with this invention.

FIG. 23 is a top plan view the wire-guiding ledge shown in FIG. 22.

FIG. 24 is a front elevational view of the wire-guiding ledge of FIG. 23 looking in the direction of arrows 24—24 of FIG. 23.

FIG. 25 is a side elevational view of the wire-guiding ledge of FIG. 23 looking in the direction of arrows 25—25 of FIG. 23.

Figure 26:
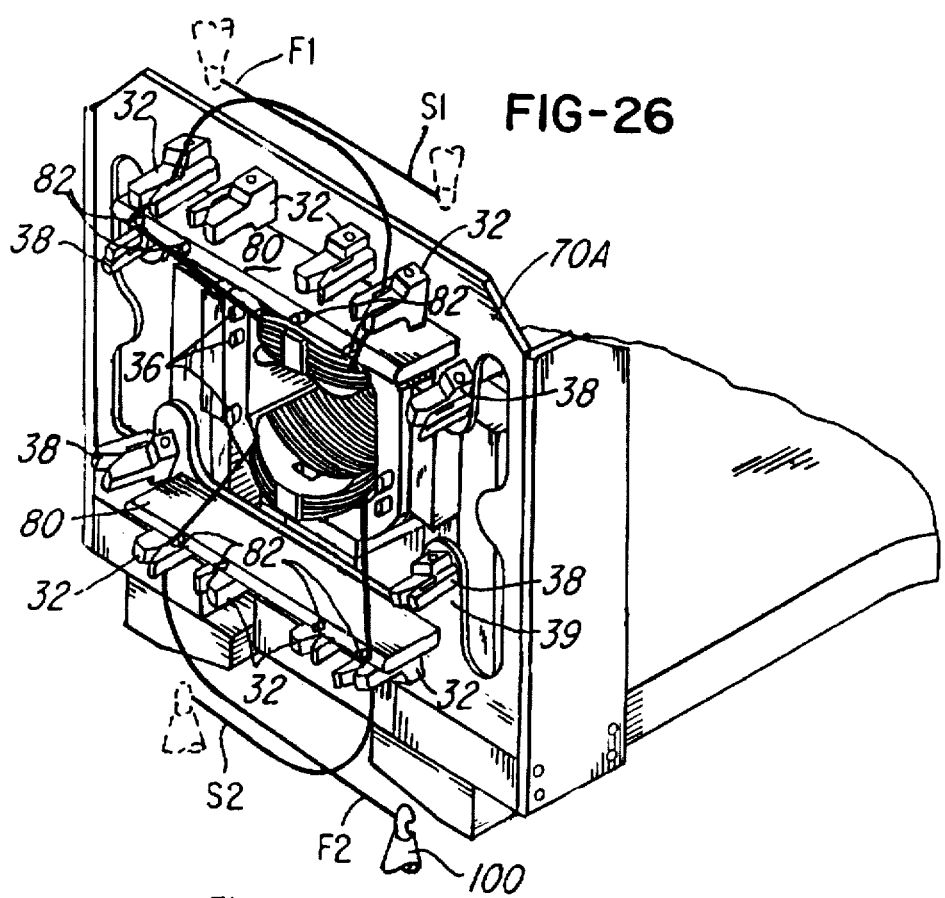
Figure 27:
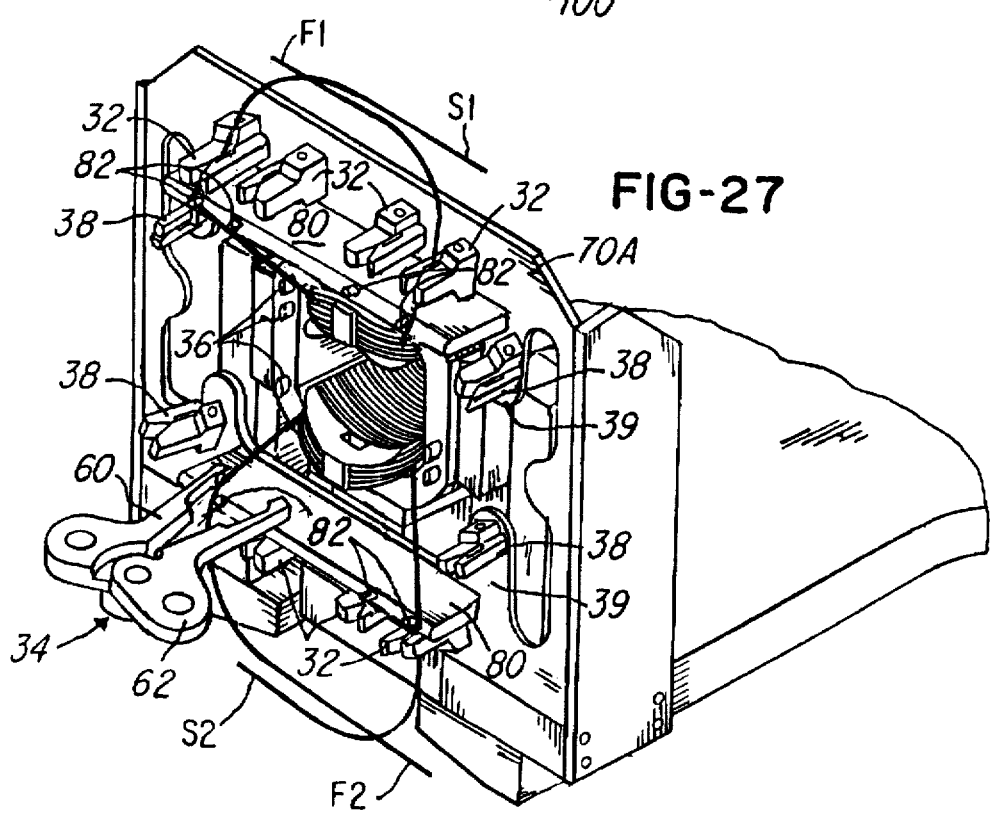

FIGS. 26 through 28 are perspective views similar to FIGS. 1 and 2 of a second embodiment of a stator winding machine in accordance with this invention which includes the preferred end effector jaws of FIGS. 16 through 21 and ledges as shown in FIGS. 23 through 25, and sequentially illustrate the coursing of a coil lead wire around a stator end face and the subsequent precision trimming thereof FIG. 29 is a perspective view similar to FIGS. 1 and 26 of a third, and presently preferred, embodiment of a stator winding machine in accordance with this invention, including preferred embodiments of a wire-guiding ledge, temporary wire clamps, and lead wire anchors.

FIG. 30 is an exploded perspective view of the wire-guiding ledge of FIG. 29.

4

Figure 31:
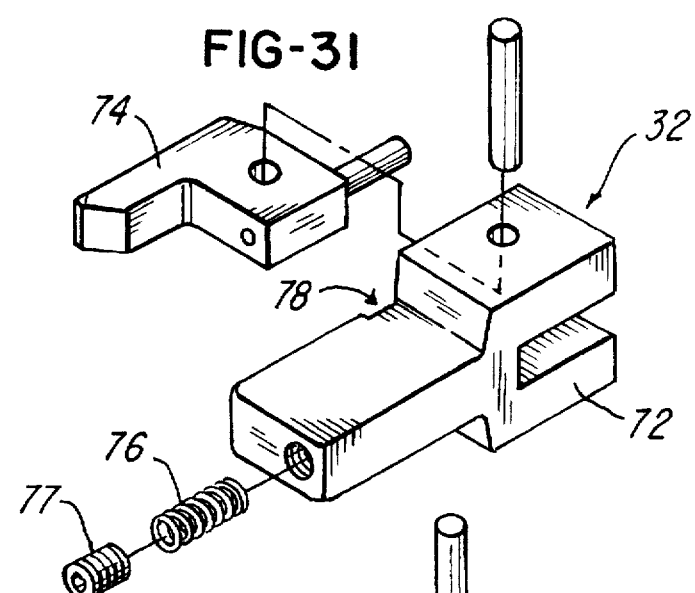
Figure 32:
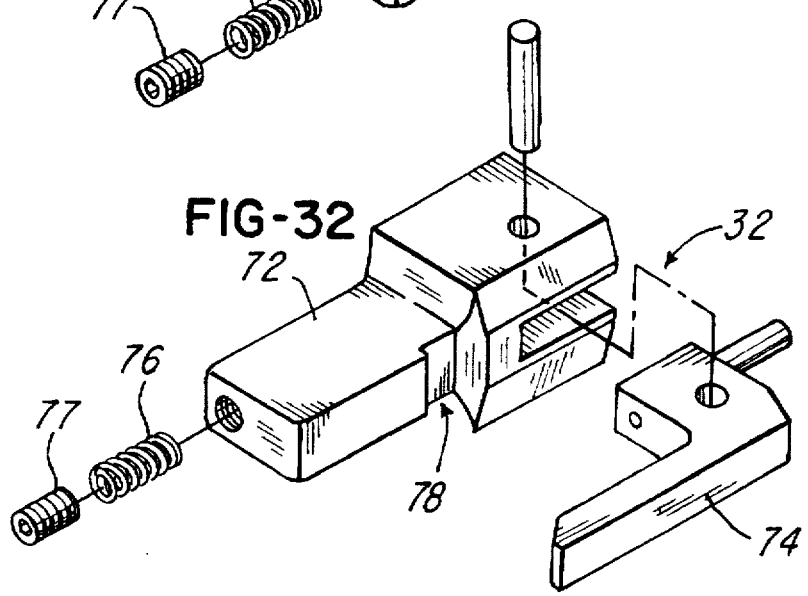

FIGS. 31 and 32 are exploded perspective views, respectively, of two different temporary wire clamps forming part of the machine of FIG. 29.

Figure 33:
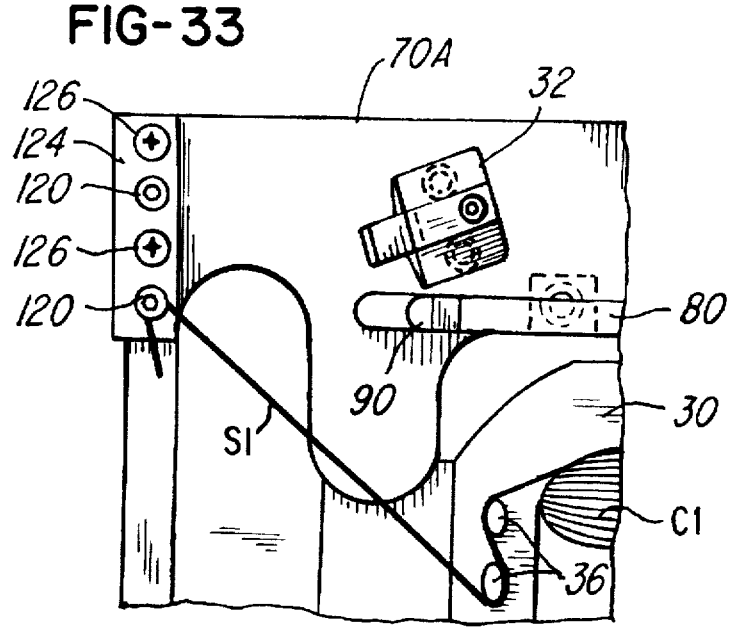

FIG. 33 is a fragmentary elevation view of a portion of the machine shown in FIG. 29 and illustrates a coil lead wire being secured to a lead wire anchor in accordance with the preferred embodiment of this invention.

Figure 34:
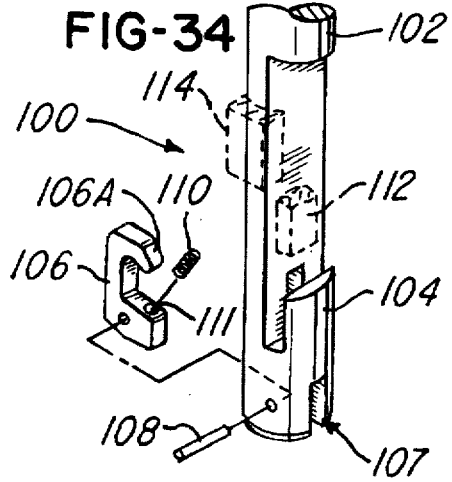

FIG. 34 is an fragmentary, exploded perspective view of a portion of an improved lead pull assembly in accordance with this invention.

Figure 35:
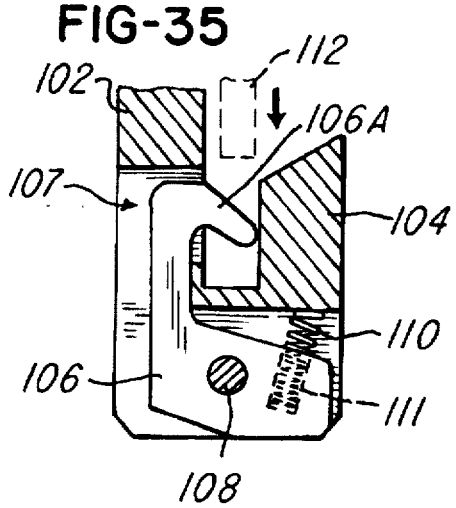

FIG. 35 is a fragmentary, cross-sectional view of a portion of the improved lead pull assembly shown in FIG. 34.

FIG. 36 is a top plan view of a wire former assembly in accordance with this invention showing wire forming tooling forming a part thereof in an inoperative, out-of-the-way position.

FIG. 37 is a side elevational view of the wire former assembly of FIG. 36, but showing the wire forming tooling forming a part thereof in an operative, upright position.

Figure 38:
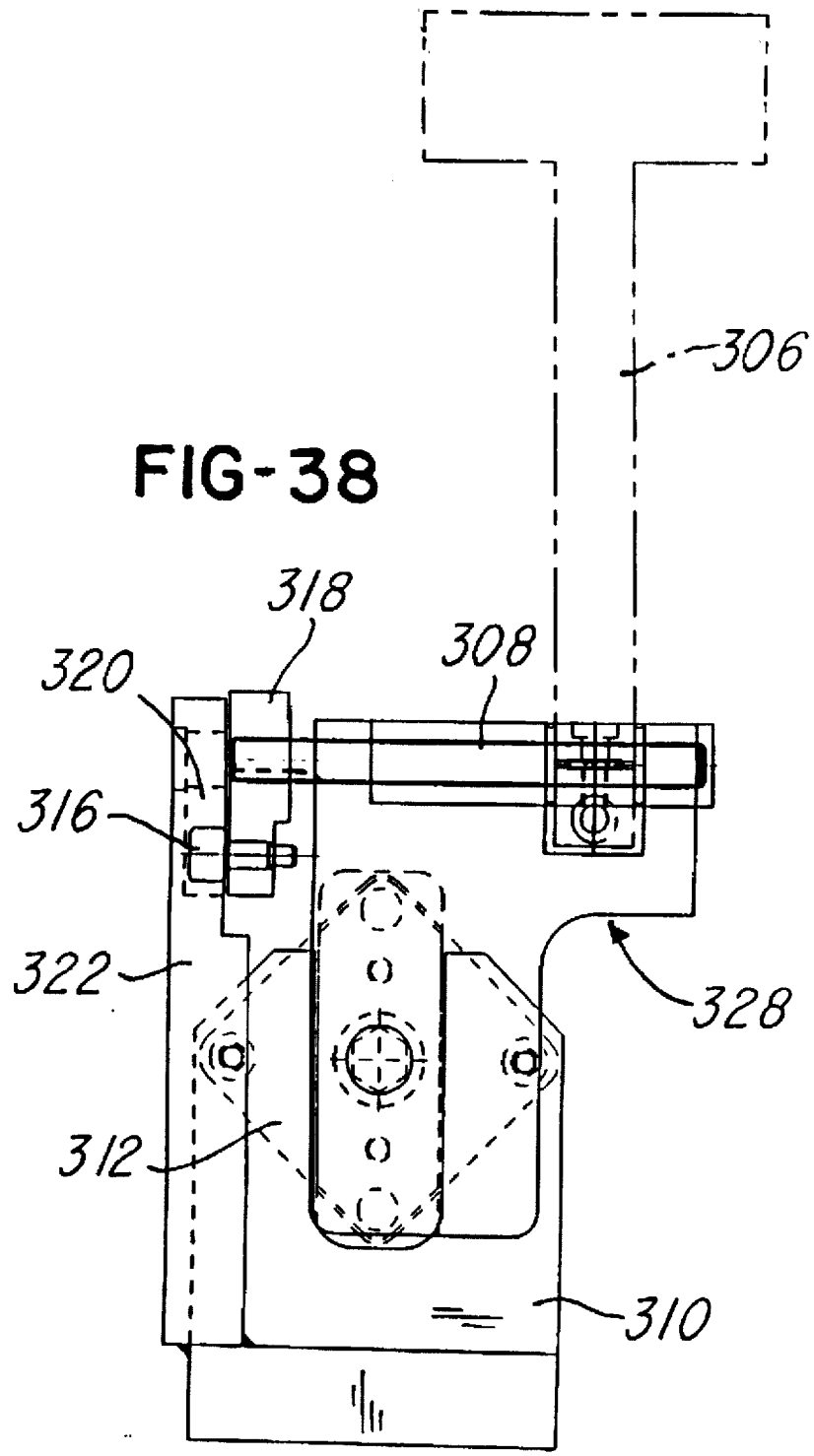

FIG. 38 is an end elevational view of the wire former assembly of FIG. 37 taken along line 38—38 thereof with portions shown in broken lines.

DETAILED DESCRIPTION

FIGS. 1 through 5 illustrate a method in accordance with this invention for manufacturing a stator 30. In FIG. 1, a pair of coils C1 and C2 have been wound on the stator 30 at a winding station, as described in commonly owned U.S. Pat. Nos. 5,185,405 and 5,370,324, which are incorporated herein by reference. (It will be noted that certain aspects of this invention may be utilized with a winding station as described in U.S. Pat. No. 5,090,108, which is incorporated by reference.) The upper coil C1 has a pair of coil lead wires, namely a start wire Si and a finish wire F1, extending therefrom which are inserted into temporary wire clamps 32 at the winding station with the assistance of lead pull assemblies 100, as will be described, and tamping blades, as described in commonly-owned PCT publication WO 96/34446, published Oct. 31, 1996, which is incorporated herein by reference. Although flat tamping blades as illustrated in the '866 application and the WO 96/34446 publication perform satisfactorily in many instances, it is presently preferred to utilize generally T-shaped tamping blades 33 as shown in FIGS. 6 through 8, which provide a larger wire-engaging surface on each tamp blade 33. The T-shaped blades 33 are in an upright orientation for the upper clamps 32 and in an inverted orientation for the lower clamps 32. A start wire S2 and a finish wire F2 of the lower coil C2 are similarly inserted into other temporary wire clamps 32. The temporary wire clamps 32 may be constructed in accordance with commonly-owned U.S. Pat. No. 5,495,659, which is incorporated herein by reference.

FIG. 2 illustrates the stator 30 at a robot connect or robot wire handling station wherein the start wire S2 of the lower coil C2 is gripped by the end effector 34 of a conventional three axis, programmable industrial robot and removed from its temporary wire clamp 32. The end effector 34 courses the start wire S2 around a plurality of posts 36 or other wire support members on the end face of the stator 30. After the start wire S2 is so coursed, the end effector 34 draws the wire radially outwardly of the stator 30 to insert the start wire S2 into a temporary wire clamp or clip 38. Thereafter, the end effector 34, which includes a cutter 35 as well known, is moved to a predetermined position relative to the stator 30 to accurately trim the start wire S2 as it is held in the clip 38. Alternatively, the lead wires may be trimmed using spring-biased cutters 200 carried by the wire clips 38, the cutters 200 being operated by appropriate movements of the end effector 34, as shown in FIG. 9.

Figure 5:
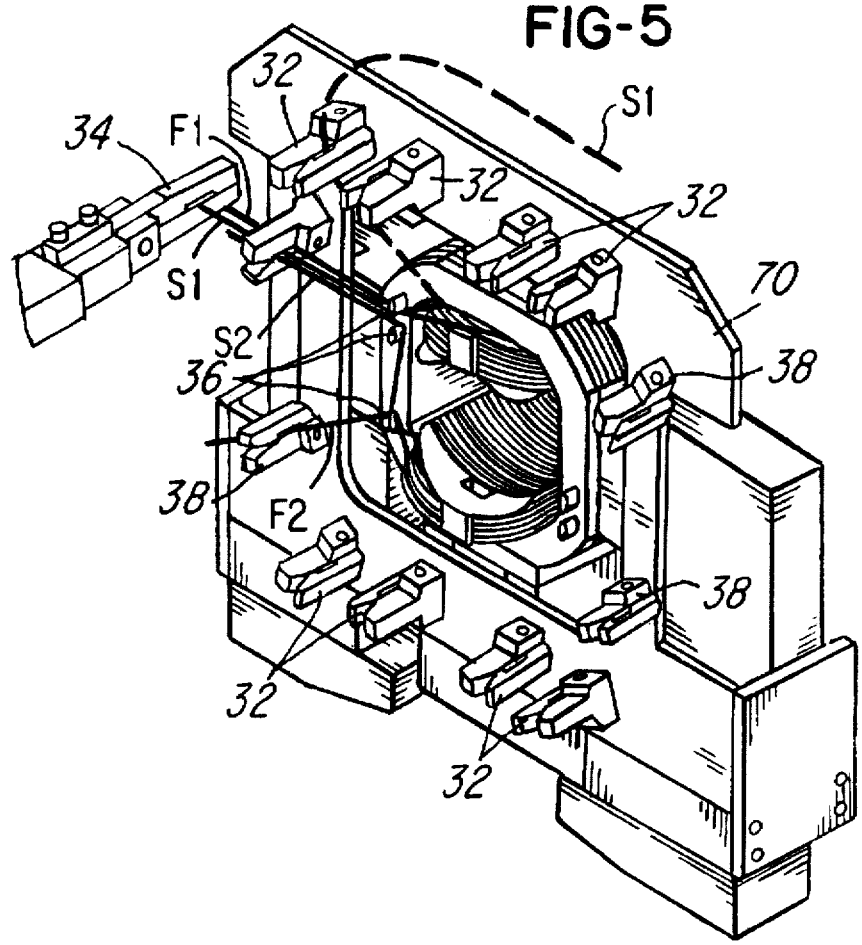
Figure 6:
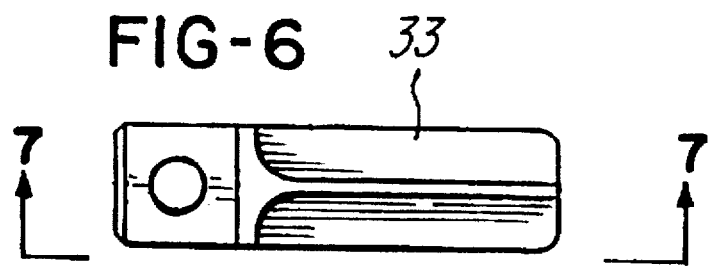
FIG. 6 is a plan view of an improved lead wire tamping blade that may be used in an aspect of this invention.

With reference to FIGS. 3 through 5, the finish wire F2, the start wire S1, and the finish wire F1 are similarly coursed around the stator end face by the end effector 34, inserted into a temporary wire clip 38, and accurately severed by the end effector 34 at a predetermined position relative to the stator 30. It will be noted that the particular stator configuration shown is FIGS. 1 through 5, which is merely illustrative, results in the start wire S2 being inserted into a separate temporary wire clip 38. Of course, the particular temporary clip 38 in which a coil lead wire is inserted will depend upon the particular configuration of the stator being manufactured. In any case, each coil lead wire will be inserted into one of the four temporary wire clips 38, which permits the end effector to be moved to a predetermined radial distance from the center of the stator to trim the lead wire.

FIGS. 10 and 11 diagrammatically illustrate the result of the above-described method in that the coil lead wires are each accurately trimmed at a predetermined position relative to the stator 30. In FIG. 10, the coil lead wires are trimmed at a predetermined distance from the outer margin of the stator core which, as illustrated, is non-circular. FIG. 11 illustrates the coil lead wires trimmed at a predetermined distance from the center axis of the stator core. In either case, the coil lead wires are trimmed at a precise predetermined location relative to the stator core. Although FIGS. 10 and 11 show the coil leads extending to different circumferential locations around the stator, it will be understood, as mentioned above, that the circumferential location of each coil lead is dependent upon the particular stator configuration and forms no part of this invention.

The temporary wire clips 38 may be constructed similarly to the wire clamps 32 in accordance with the aforementioned '659 patent, or they may constructed as shown in FIGS. 12 through 14 hereof. FIGS. 12 through 14 illustrate an alternate temporary wire clip 40. The wire clip 40 is formed from nylon and includes a fixed base 42 and a somewhat flexible, self-biasing clip jaw 44 connected thereto. A self-biasing hinge 46 is formed on the clip jaw 44 by providing an area of reduced thickness. As a result, the wire clip 40 does not require an air actuator or the like (not shown) for operation. In addition, the wire clip 40 has a low profile, which is beneficial in inserting the coils lead wires into the temporary wire clips 40 for trimming. As common, the clips 40 are secured to a support plate 70 (FIG. 1) by a pair of screws (not shown).

With reference to FIG. 15, the end effector 34 may be conventional, in which case it includes a pair of opposed, movable gripper jaws 50 and 52. The coil lead wires are individually gripped between the jaws 50 and 52 and manipulated by movement of the end effector 34 to follow a predetermined path along the stator end face. However, in many instances, the desired paths of the coil lead wires along the stator end face are so complex and circuitous that a conventional end effector 34 with opposed gripping jaws 50 and 52 is not capable of coursing the lead wires as desired.

FIGS. 16 through 21 illustrate improved end effector wire-guiding tooling members 60 and 62 which are preferably used in place of the conventional gripper jaws 50 and 52, the wire-guiding tooling member 62 being a mirror image of the wire-guiding tooling member 60. In accordance with this invention, the jaws 60 and 62 have mutually-confronting C-shaped free ends 64 which, when closed together, form a ring or eyelet 66 (FIG. 21). Alternatively, the C-shaped ends 64 may have a greater length, in which case they form, when together, a cylindrical tube (not shown), the tube and the eyelet 66 being equivalent for purposes of this invention. The wire-guiding tooling members 60 and 62 also have confronting cutter blades 68 that, as apparent, are used to sever the coil lead wires after they are inserted into the temporary wire clips 38 or 40, as described above.

With particular reference to FIG. 21, the eyelet 66 formed at the free end of the wire-guiding tooling members 60 and 62, when closed, permits the coil lead wires to be coursed around complex and circuitous paths on the stator end face. The C-shaped members 64 are first aligned with and then closed around a lead wire extending from a stator coil to a temporary wire clamp 32 so that the lead wire passes through the resulting eyelet 66. As the end effector 34 is moved to manipulate the lead wire, the lead wire is bent slightly around the margin of the eyelet 66 opposite the direction of motion of the end effector 34, as indicated by the arrows in FIG. 21. As a result, the lead wire closely follows the complex and circuitous movements of the end effector.

A concern may arise that the lead wires could be damaged if the junction between the C-shaped ends 64 of the wire-guiding tooling members 60 and 62, when they are brought together to form the eyelet 66, is not smooth. To overcome such concern, it is contemplated that the robot will not only be able to operate along three axes, but that it may also have a wrist capable of rotational movement. Thus, the wrist could be operated, depending on the direction of movement of the end effector 34, so that the lead wires remain within the bight of one of the C-shaped ends 64, rather than at the junction of the ends 64.

Another concern that may arise is the ability of the end effector 34 forming the eyelet 66 to draw the coil lead wires into the wire clips 38, which are biased in a closed position. The concern arises due to the nominal drag on the coil lead wires as when they are trapped within the eyelet 66. A possible solution would be to provide some means, such as air actuators for example, to open the wire clips 38, thereby facilitating the easy insertion of the coil lead wires therein.

In a typical stator manufacturing apparatus such as shown in the aforementioned '405 and '324 patents, the temporary wire clamps 32 are mounted on a support plate 70 (FIG. 1). The coil lead wires typically extend from the coils C1 and C2 to the temporary wire clamps 32 at a small or flat angle relative to the plane of the support plate 70 and, in some cases, substantially parallel to the support plate 70. When using the preferred end effector wire-guiding tooling members 60 and 62, a small or flat angle between the plane of the support plate 70 and the coil lead wires may cause difficulty in forming the eyelet 66 around the coil leads. This difficulty arises because the C-shaped ends 64 of the wire-guiding tooling members 60 and 62 lie in a plane parallel to the support plate, i.e. the eyelet passageway or aperture extends perpendicular to the support plate 70. Thus, it is difficult to align the end effector 34 with the coil lead wires such that they extend through the bights of the C-shaped ends 64, which would permit the C-shaped ends 64 to be closed around the coil lead wire with the wire passing through the resulting eyelet 66.

To permit the coil lead wires to be more readily enclosed within the eyelet 66, it is desirable to have at least a portion of the coil leads extending from their respective coils at an artificially steep angle relative to the support plate 70. With reference to FIG. 22, a ledge 80 is secured to and extends outwardly from the support plate 70. A coil lead wire, which is the start wire S2 of the coil C2 in FIG. 22, extends over or around the ledge 80 and into its temporary wire clamp 32. The finish wire F2 similar extends over or around the ledge 80 and an upper ledge 80 (FIG. 26) similarly controls the path of the start wire Si and the finish wire F1 of the upper coil C1. As a result, the coil lead wires extend outwardly away from the support plate 70, around the ledges 80, and then inwardly into the temporary wire clamps 32. Because portions of each of the coil lead wires extend away from the support plate 70 at a relatively steep angle, the end effector 34 can be positioned as shown in FIG. 22 so that the selected coil lead wire will extend through the bight of the C-shaped ends 64 of the end effector wire-guiding tooling members 60 and 62, thereby permitting the eyelet 66 to be formed with the selected coil lead wire trapped therein.

In order to permit the coil lead wires to be repeatably enclosed within the eyelet 66, it is critical that the coil lead wires extend from the coils C1 and C2 to the temporary wire clamps 32 along the same, precise paths from one stator to the next. With reference to FIGS. 23 through 25, which show one of the ledges 80 in detail, the ledges 80 may have dowel pins 82 projecting about ⅛" to 3/16" from the front edge thereof, one for each associated temporary wire clamp 32, to ensure precise location of the coil lead wires. As well known, the coil lead wires are inserted into the temporary wire clamps 32 at the winding station by use of lead pull assemblies 100, such as shown in the '405 and '324 patents. Other examples of a lead pull assembly are shown in commonly-owned U.S. Pat. Nos. 5,413,403 and 4,074,418, which are incorporated herein by reference. A lead pull assembly 100 grips each coil lead wire and then swings radially outwardly away from the center of the stator 30 until the coil lead wire extends radially outwardly of the associated dowel pin 82 projecting from the associated ledge 80. The lead pull assembly 100 then swings in a reverse direction to draw the coil lead wire against the dowel pin and then into alignment with its temporary wire clamp 32. Because the coil lead wire is drawn against the fixed dowel pin 82, the coil lead wire extends along substantially the same precise path, relative to the stator, from one stator to the next, thereby permitting the programmable end effector 34 to repeatably form the eyelet 66 around the coil lead wire.

With reference to FIGS. 34 and 35, although the lead pull assembly 100 may be constructed as shown in the patents mentioned in the preceding paragraph, it is presently preferred to use an improved lead pull assembly 100, a lower end portion of which is illustrated in FIGS. 34 and 35. As well known to one skilled in the art, a typical lead pull assembly 100 includes a lead pull rod 102 having a lower end portion terminating in a upwardly-facing, hook-like, U-shaped jaw 104 which engages a strand of wire to be manipulated (not shown). However, if a slack condition occurs in the stand of wire due to the particular movements of the lead pull assembly 100, for example, the wire can move outwardly of the bight of the jaw 104 along the rod 102, in which case the lead pull assembly's grip on the wire is lost.

As shown in FIGS. 34 and 35, the preferred lead pull assembly 100 is provided with a pivotal finger 106 have a downwardly-facing hook portion 106A that retains the strand of wire in the bight of the jaw 104. The finger 106 is pivotally mounted in a longitudinal L-shaped slot 107 at the lower end of the rod 102 by a roll pin 108, which defines the pivot axis of the finger 106. A compression spring 110 is partly received in a recess 111 in the body of the finger 106 and is trapped between the finger 106 and the rod 102, as shown in FIG. 35. Of course, it will be recognized that other resilient biasing members could be used in place of the compression spring 110. As evident, the spring 110 biases the finger 106 toward the position shown in FIG. 35 to close the jaw 104.

As apparent from FIG. 35, a longitudinally-downward force applied to the hook portion 106A of the finger 106 will overcome the bias of the spring 106, thereby causing the finger 106 to be cammed and pivoted to an out-of-the-way location so that the strand of wire can be inserted into the bight of the jaw 104. However, once the wire is so located, the finger 106 will retain the wire in the bight of the jaw 104 if a slack condition occurs in the strand of wire.

As also well known in the art, the lead pull assembly 100 further includes a wire holding and cutting mechanism comprising a wire holder 112 and a cutting blade 114, fragments of which are shown diagrammatically in FIG. 35 and 36 and the details of which are unimportant for purposes of this invention. The wire holder 112 and the cutting blade 114 are driven downwardly relative to the lead pull rod 102 by an air actuator (not shown) to hold and sever a wire held in the jaw 104, the holder 112 trapping the wire against the jaw 104 and the cutting blade 114 severing the wire. Although the finger 106, when in its normally-biased position, blocks access to the bight of the jaw 104, the wire holder 112 engages and cams the finger 106 to an out-of-the-way position, thereby permitting the holder to trap the lead wire against the jaw 104 for severing by the cutting blade 114.

Referring now to FIGS. 26 through 28, which are similar to FIGS. 1 and 2, the coursing of a coil lead wire around the stator end face and the subsequent precision trimming thereof using the preferred end effector having wire-guiding tooling members 60 and 62 in conjunction with the ledges 80 and dowel pins 82 are shown. FIGS. 26 through 28 also illustrate an alternative support plate 70A having the wire clips 38 located on islands 39. The operation of the respective components shown in FIGS. 26 through 28 will be evident from the foregoing discussion.

FIG. 29 illustrates a presently preferred embodiment of this invention. In general, the structures illustrated in FIG. 29 are =similar to corresponding structures discussed above, but certain modifications shown in FIG. 29 have been found to be desirable.

With regard to FIGS. 29 and 30, a modified ledge 80 is shown and include a central notch 84 in the front surface thereof and a central notch 86 in the rear surface thereof. The front notch 84 provides clearance for a wire former assembly which will be discussed below. The rear notch 86 provides an opening 88, best shown in FIG. 29, through which winding form retainers (not shown) are inserted to secure winding forms (not shown) to the stator core during the coil winding process.

In addition, the dowel pins 82 projecting from the ledge 80 shown in FIGS. 22 through 25 are replaced in FIG. 29 by wire-retaining hooks 90. The hooks 90 are press-fit into apertures 92 formed in the ledge 80 and fit into notches or reliefs 94 formed in the front surface 96 of the ledge 80, which reliefs 94 provide key surfaces to prevent rotation of the hooks 90 relative to the ledge 80. The apertures 92 are eccentrically located within the reliefs 94, and posts 98 of projecting from the hooks 90 are likewise offset toward one side of the thereof. As a result, the hooks 90 can only be inserted into the apertures 92 so that they face outwardly toward a side of the ledge 80, as shown in FIGS. 29 and 30.

As best seen in FIG. 30, the hooks 90 are formed with cam surfaces 99. As a lead wire is moved radially outwardly past a hook 90, as described above with regard to the dowel pins 82, the lead wire is cammed over the hook 90 by the cam surface 99 thereon. When the lead wire is then drawn in a reverse direction to be inserted into a temporary wire clamp 32, the wire is trapped or caught within the bight of the hook 90, as shown in FIG. 29. Here, it will be noted that FIG. 29 also differs from previously described figures in that the start wire Si is looped around a hook 90 to the left of the stator, as shown in FIG. 29, and then drawn toward and inserted into the right-most clamp 32. Likewise, the finish wire F1 is looped around the right-most hook 90 and then drawn toward and inserted into the left-most wire clamp 32. The start and finish wires S2 and F2 of the lower coil C2 are similarly connected to wire clamps 32. Extension of the coil leads to opposite wire clamps 32 provides leads of sufficient length to follow the desired paths on the stator core without requiring unduly long stretches of wire extending past the temporary wire clamps 32.

With particular regard to the wire clamps 32, it is preferred that the wire clamps 32 be constructed as shown in FIGS. 31 and 32, depending on the location of the clamp 32 relative to the stator 30. The wire clamps 32 shown in FIGS. 31 and 32 are substantially similar to the clamps described in the aforementioned U.S. Pat. No. 5,495,659 and include a fixed jaw 72 and a pivotal jaw 74 biased by a spring 76 held in place by a set screw 77. However, it is desirable to make certain modifications shown in FIGS. 31 and 32. For example, it will be noted that the fixed jaw 72 of the presently preferred clamp 32 does not have a chamfered nose as shown in the '659 patent. Also, the upper left-most pair of wire clamps 32 and lower right-most pair of wire clamps 32, as viewed in FIG. 29, are each preferably formed with a shortened pivotal jaw 74, as shown in FIG. 31. (FIG. 32 shows a longer pivotal jaw 74 which is used with the upper right-most and lower left-most pairs of clamps 32.) Such shortened pivotal jaws 74 on the upper left-most pair and lower right-most pair of clamps 32 are necessary to avoid interfering with movements of the lead pull assembly 100 needed to insert the lead wires into such wire clamps 32.

FIGS. 31 and 32 also illustrate a transverse slot 78 formed in the wire-engaging surface of the fixed jaw 72 of each wire clamp 32. The transverse slot 78 in each clamp 32 is provided to retain the lead wire in the wire clamp 32 immediately after it has been inserted or "stuffed" therein by a tamp blade 33 (FIGS. 6 through 8), as described above. It has been found that without the transverse slot, the lead wire tends to withdraw from the wire clamp 32 as the tamp blade 33 is withdrawn, in part because the clamp 32 does not fully close until the tamp blade 33 is no longer between the jaws 72 and 74. Using a preferred clamp 32, as shown in FIGS. 31 and 32, a lead wire inserted into the clamp 32 moves into the transverse slot 78 in the fixed clamp jaw 72 and is thus retained as the tamp blade 33 is withdrawn.

With reference to FIGS. 29 and 33, the apparatus shown therein is also modified to replace the wire clips 38 or 40 shown in FIGS. 1 through 5, 12 through 14, and 26 through 28. In place of the wire clips 38 or 40, a plurality of wire-wrapping posts 120 are provided in fixed relation to the stator 120. Instead of inserting the lead wires into wire clips 38 or 40 after they have been coursed along the stator end face by use of the above-described robot end effector 34, each lead wire is partly wrapped or looped around the shaft of one of the posts 120, as shown in FIG. 33. The location of each post 120 and the particular post 120 used with each lead wire is dependent upon the particular configuration of the stator being manufacture. A lead wire so looped around a post 120 is temporarily held in place by the "memory" present in the metal wire. After a lead wire is looped around a post 120, it is released by the robot end effector 34 and then trimmed at a predetermined distance from the stator core, as described above.

The use of wire-wrapping posts 120 in place of the wire clips 38 or 40 obviates the concern mentioned above regarding the nominal drag on a lead wire enclosed within the end effector eyelet 66 and its effect on the ability of the end effector 34 to insert the lead wire between the jaws of a clip 38 or 40.

As best seen in FIG. 29, each of the posts 120 preferably includes an enlarged head 122 at the free end thereof which prevents the partially looped wire from slipping over the free end of the post 120. The illustrated posts 120 are simple socket-headed screws threaded into support plates 124, which are in turn attached to the upstanding support plate 70A by screws 126. Of course, other post configurations could be used.

FIGS. 36 through 38 illustrate a wire former assembly, generally designated 300, in accordance with this invention, which is used to press the lead wires extending along the stator core end face against the stator core end face. In accordance with this invention, the wire former assembly 300 is located at the wire handling station and comprises wire forming tooling 302 having surfaces 304 contoured to conform to the paths of the stator coil lead wires that have been coursed along the end face of the stator core, as described above. (Of course, the wire former assembly 300 could be located at a separate station.) The configuration of the wire forming tooling 302 shown in FIG. 36 is merely illustrative, it being understood that the particular configuration of the wire forming tooling 302 depends of the configuration of the stator being manufactured and forms no part of this invention.

The wire forming tooling 302 is carried by a support arm 306 fixedly-attached to a pivot rod 308 extending transversely through a support member 310. The support member 310 is driven linearly toward and away from a stator core at the wire handling station by a conventional, commercially-available air actuator 312 having a piston rod 314 connected to the support member 310. A cam roller 316 is mounted eccentrically at the end of the pivot rod 308 by an extension 318 and is received in a guide slot 320 formed in an upstanding support plate 322. The guide slot 302 has an arcuate portion 324 and a linear portion 326.

When the piston rod 314 of the actuator 312 is fully retracted, the cam roller 316 is located at lower end of the guide slot 320, and the support arm 306 and the wire forming tooling 302 are in an out-of-the-way position, as shown in FIG. 36. As the piston rod 314 is extended, the support member 310 moves toward the stator located at the wire handling station and the cam roller 316 travels along the arcuate portion 324 of the guide slot 320, thereby pivoting the support arm 306 and the wire guide tooling 302 to an upright position confronting a stator at the wire handling station, as shown in FIGS. 37 and 38. As the piston rod 314 is further extended, the cam roller 316 travels along the linear portion 326 of the guide slot 320 and the support arm 306 and the wire forming tooling 302 are translated in their upright position toward and into engagement with the stator. The contoured surfaces 304 are thus driven into engagement with the lead wires coursed along the stator core end face to press them into position close to the stator core end face. Thereafter, the piston rod 314 of the air actuator 312 is retracted to return the support arm 306 and the wire forming tooling 302 to their out-of-the-way position shown in FIG. 36.

Although not shown in FIGS. 36 through 38, it is desirable to provide a second support plate opposite to the support plate 322 to provide additional support for the support member 310 as it is driven toward and away from the stator core by the air actuator 312. To this end, the support member 310 is formed generally in the shape of an inverted L, as best seen in FIG. 38, and has a bearing surface 328 which travel along a corresponding bearing surface (not shown) of an upstanding support plate (not shown) opposite the support plate 322. Preferably, the second support plate has bearing surface formed from lamina bronze.

Although the presently preferred embodiments of this invention have been described, it will be understood that various changes may be made without departing from the scope of the following claims.

Having thus described our invention, we claim:

1. A method for manufacturing a stator, comprising:
   winding coils of wire around pole pieces of a stator core located at a winding station, each of said coils having a start lead and a finish lead which are inserted into corresponding temporary wire clamps at said winding station;
   transferring the wound stator core and said temporary clamps to a robot wire handling station; and
   performing the following steps for each of said start and finish leads while said stator core is at said robot wire handling station:
   removing said lead from its corresponding wire clamp,
   coursing said lead along a predetermined path on an end face of said stator core,
   extending said lead radially-outwardly from said stator core,
   securing said lead to an anchor member at a location radially spaced from said stator core, and
   thereafter, severing said lead at a predetermined location radially intermediate said anchor and said stator core.

2. The method of claim 1 wherein said stator core has a center axis and wherein, for each of said leads, said predetermined location radially intermediate said anchor and said stator core is a predetermined distance from the center axis of said stator core.

3. The method of claim 1 wherein said stator core has an outer margin and wherein, for each of said leads, said predetermined location radially intermediate said anchor and said stator core is a predetermined distance from the outer margin of said stator core.

4. The method of claim 1 wherein the removing, coursing, extending and securing steps with respect to each coil lead each comprises manipulating each coil lead with a robot end effector.

5. The method of claim 1 wherein the respective anchor to which each said coil lead is secured comprises a wire clip having opposed jaws and wherein, for each coil lead, said securing steps comprises inserting said coil lead between the opposed jaws of a wire clip.

6. The method of claim 1 wherein the respective anchor to which each said coil lead is secured comprises a post having a shaft and wherein, for each coil lead, said securing step comprises looping said coil lead at least party around the shaft of said post.

7. The method of claim 6 wherein each said post has an enlarged head at one end of the shaft thereof to retain the coil looped therearound in engagement with the shaft.

* * * * *

UNITED STATES PATENT AND TRADEMARK OFFICE
CERTIFICATE OF CORRECTION

PATENT NO. : 5,765,274
DATED : June 16, 1998
INVENTOR(S) : Beakes et al.

It is certified that error appears in the above-identified patent and that said Letters Patent is hereby corrected as shown below:

Column 3, line 1, change "a" to --an--;

Column 3, line 16, after "part", insert --of--;

Column 3, line 31, after "is", insert --a--;

Column 3, line 35, after "is", insert --a--;

Column 3, line 60, after "thereof", insert --.--;

Column 4, line 4, change "elevation" to --elevational--;

Column 5, line 38, after "may", insert --be--;

Column 7, line 54, change "stand" to --strand--;

Column 7, line 60, change "have" to --having--;

UNITED STATES PATENT AND TRADEMARK OFFICE
CERTIFICATE OF CORRECTION

PATENT NO. : 5,765,274
DATED : June 16, 1998
INVENTOR(S) : Beakes et al.

It is certified that error appears in the above-identified patent and that said Letters Patent is hereby corrected as shown below:

Column 8, line 46, change "and include" to --that includes--;

Column 8, line 63, change "thereof" to --hooks 90--;

Column 10, line 32, change the second occurrence of "of" to --upon--;

Column 11, line 8, change "travel" to --travels--;

Column 11, line 11, after "has", insert --a--.

Signed and Sealed this

Fifteenth Day of June, 1999

Attest:

Q. TODD DICKINSON

*Attesting Officer*  *Acting Commissioner of Patents and Trademarks*